(12) United States Patent
Pagel et al.

(10) Patent No.: US 10,835,979 B2
(45) Date of Patent: Nov. 17, 2020

(54) SOLDERING TIP FOR A SOLDERING IRON (71) Applicant: SAINT-GOBAIN GLASS FRANCE, Courbevoie (FR)

(72) Inventors: Bruno Pagel, Aldenhoven (DE); Katja Werner, Simmerath (DE); Lothar Lesmeister, Landgraaf (NL); Fahri Kabadayi, Wuerselen (DE)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 139 days.

(21) Appl. No.: 16/067,117

(22) PCT Filed: Apr. 12, 2017

(86) PCT No.: PCT/EP2017/058799
§ 371 (c)(1),
(2) Date: Jun. 28, 2018

(87) PCT Pub. No.: WO2017/194261
PCT Pub. Date: Nov. 16, 2017

(65) Prior Publication Data
US 2019/0015918 A1    Jan. 17, 2019

(30) Foreign Application Priority Data

May 10, 2016 (EP) ..................... 16168832

(51) Int. Cl.
*B23K 3/00* (2006.01)
*B23K 3/02* (2006.01)
(Continued)

(52) U.S. Cl.
CPC ........ *B23K 3/026* (2013.01); *B23K 2101/006* (2018.08); *B23K 2101/34* (2018.08)

(58) Field of Classification Search
CPC ............... B23K 3/026; B23K 2101/34; B23K 2101/006; B23K 3/02–0392; H05B 3/84
(Continued)

(56) References Cited

U.S. PATENT DOCUMENTS 1,428,227 A * 9/1922 Griffin ................. B23K 3/0338
219/238
2,724,042 A * 11/1955 Adamson ............. B23K 3/0361
219/239
(Continued)

FOREIGN PATENT DOCUMENTS

CN 103128969 A 6/2013
CN 104335422 A 2/2015
(Continued)

OTHER PUBLICATIONS

International Search Report for PCT/EP2017/058799 dated Apr. 12, 2017 on behalf of Saint-Gobain Glass France. dated Jul. 18, 2017. 5 pages. (English Translation + German Original).
(Continued)

*Primary Examiner* — Kiley S Stoner
(74) *Attorney, Agent, or Firm* — Pillsbury Winthrop Shaw Pittman LLP (57) ABSTRACT

A soldering tip for a soldering iron is presented. In one aspect, the soldering tip is used in a hand-held soldering iron for soldering an electrical connection element on an electrically conductive structure on a substrate. The soldering tip includes a substantially hemispherical end portion. Also presented is a method for producing a pane with an electrical connection element using the soldering tip with a hand-held soldering iron.

11 Claims, 5 Drawing Sheets

(51) Int. Cl.
*B23K 101/00* (2006.01)
*B23K 101/34* (2006.01)

(58) Field of Classification Search
USPC .................................................. 228/51–55
See application file for complete search history.

(56) References Cited

U.S. PATENT DOCUMENTS

| | | | | |
|---|---|---|---|---|
| 2,748,245 A * | 5/1956 | Pearce | ................ | B23K 3/0307 |
| | | | | 219/230 |
| 2,845,518 A * | 7/1958 | Teicheire | ............ | B23K 3/0361 |
| | | | | 228/55 |
| 3,553,833 A * | 1/1971 | Jochim et al. | ........... | H05B 3/84 |
| | | | | 29/611 |
| 3,813,519 A * | 5/1974 | Jochim | ................. | H01C 17/16 |
| | | | | 219/522 |
| 4,500,027 A * | 2/1985 | Nakajima | .............. | B23K 3/025 |
| | | | | 228/54 |
| 4,785,793 A * | 11/1988 | Oglesby | ................ | B23K 3/022 |
| | | | | 126/413 |
| 4,974,768 A * | 12/1990 | Ebata | ..................... | B23K 3/025 |
| | | | | 148/403 |
| 5,246,157 A * | 9/1993 | Siegel | .................... | B23K 3/026 |
| | | | | 228/18 |
| 5,446,261 A | 8/1995 | Hernandez et al. | | |
| 6,249,966 B1 | 6/2001 | Pereira et al. | | |
| 6,253,988 B1 * | 7/2001 | Pereira | ................... | B23K 35/26 |
| | | | | 228/122.1 |
| 7,030,339 B2 | 4/2006 | Nagase | .................. | C22C 38/16 |
| | | | | 219/229 |
| 7,442,271 B2 * | 10/2008 | Asmussen | ......... | B23K 26/0096 |
| | | | | 118/723 ME |
| 7,845,546 B2 * | 12/2010 | Bertsch | .................. | C04B 35/10 |
| | | | | 228/121 |
| 7,926,695 B2 * | 4/2011 | Hagen | ..................... | B23K 1/19 |
| | | | | 228/121 |
| 8,840,007 B2 * | 9/2014 | Li | ....................... | E06B 3/66304 |
| | | | | 228/121 |
| 9,595,768 B2 * | 3/2017 | Lyon | ...................... | B23K 35/26 |
| 10,357,840 B2 * | 7/2019 | Gleisberg | ................ | B23K 1/19 |
| 2003/0189081 A1 * | 10/2003 | Dunham | .............. | B23K 3/0315 |
| | | | | 228/55 |
| 2006/0191977 A1 * | 8/2006 | Choi | ...................... | B23K 1/018 |
| | | | | 228/101 |
| 2007/0224842 A1 | 9/2007 | Hoepfner et al. | | |
| 2013/0056246 A1 * | 3/2013 | Laurencot | ................ | H05B 3/84 |
| | | | | 174/251 |
| 2015/0162677 A1 | 6/2015 | Schmalbuch et al. | | |
| 2015/0236431 A1 | 8/2015 | Schmalbuch et al. | | |
| 2018/0099343 A1 * | 4/2018 | Antaya | .................... | B23K 3/03 |

FOREIGN PATENT DOCUMENTS

| | | |
|---|---|---|
| CN | 206066590 U | 4/2017 |
| DE | 7739300 U1 | 4/1978 |
| EA | 201590429 A1 | 6/2015 |
| FR | 2094356 A5 | 2/1972 |
| JP | S57-170875 U | 10/1982 |
| JP | S58-134262 U | 9/1983 |
| JP | 2001-001138 A | 1/2001 |
| JP | 2009-136920 A | 6/2009 |
| JP | 2015-527278 A | 9/2015 |
| JP | 2016-505194 A | 2/2016 |
| RU | 2155117 C2 | 8/2000 |
| RU | 2553144 C2 | 6/2015 |
| SU | 236652 A1 | 2/1969 |
| WO | 2013/182394 A1 | 12/2013 |
| WO | 2014/040773 A1 | 3/2014 |

OTHER PUBLICATIONS

Written Opinion for International Application No. PCT/EP2017/058799 dated Apr. 12, 2017 on behalf of Saint-Gobain Glass France. dated Jul. 18, 2017. 12 pages (English Translation + German Original).
Office Action issued in Chinese Patent Application No. 201780001092.7, dated Mar. 3, 2020.

* cited by examiner

SOLDERING TIP FOR A SOLDERING IRON

CROSS REFERENCE TO RELATED APPLICATIONS

The present application is the U.S. national stage of International Patent Application PCT/EP2017/058799 filed internationally on Apr. 12, 2017, which, in turn, claims priority to European Patent Application No. 16168832.0 filed on May 10, 2016.

The invention relates to a soldering tip for a soldering iron and its use in the production of a pane with an electrical connection element.

Window panes, in particular vehicle panes are frequently equipped with electrically conductive structures. Examples of such conductive structures are printed heating conductors or antennas. For connection to the necessary voltage source or transmitting or receiving unit, electrical connection elements are typically soldered on a region of the conductive structure, which is or can be connected to an electrical connection cable.

A variety of different types of connection elements are known. U.S. Pat. No. 6,249,966 B1, US 2007/0224842 A1, and WO2013/182394 A1 disclose connection elements that are implemented as snaps. These connection elements have the advantage of a convenient and reversible connection to the connection cable. Typically, the male snap is soldered on the pane and the female snap is provided with the connection cable. Male and female snaps can be connected to one another simply as intended in order to establish the electrical contact.

WO 2014/040773 A1 discloses a connection element crimped around the connection cable, wherein the crimp is soldered directly onto the conductive structure.

The soldering of connection elements can be automated using soldering robots. Alternatively, however, the connection elements can also be hand soldered, which is economically viable in particular in low-wage countries and with relatively small lots. In hand soldering, controllable or non-controllable soldering irons, typically equipped with interchangeable soldering tips, are used. The soldering tip is brought into contact with the connection element, whereupon it transfers the heat generated by the soldering iron via the connection element to the soldering compound, which is fuzed thereby. For this, soldering tips must have high thermal conductivity and are typically made of copper. Commonly used soldering tips are shaped chisel-like with an elongated pointed end portion for contacting the connection element. In addition, rod electrodes with a flat end portion for contacting the connection element are commonly used as soldering tips.

In hand soldering, care must be taken that the soldering tip has good contact that is as extensive as possible with the connection element in order to ensure efficient energy input. This places high demands on the careful work of the technician. In addition, during hand soldering, it is often necessary to specifically fix the connection element in place to ensure its stable positioning. The reason for this is the locally very limited introduction of energy with conventional soldering tips that require very high energy input to fuze the entire solder. The soldering compound must, consequently, be strongly heated and, as a result, solidifies only very slowly such that the connection element floats, so to speak, on the soldering compound and its position can change.

The object of the present invention is to provide an improved soldering tip for a soldering iron, in particular a hand-held soldering iron and an improved method executed therewith for producing a pane with an electrical connection element. The soldering tip should, in particular, ensure homogeneous energy input and enable more convenient soldering as well as making separate fixing of the connection element during the soldering operation unnecessary.

The object is accomplished according to the invention by a soldering tip in accordance with the disclosure. Preferred embodiments also emerge from the disclosure.

The soldering tip according to the invention for a soldering iron is intended for soldering an electrical connection element to an electrically conductive structure on a substrate, in particular on a window pane made of glass. The soldering tip comprises an end portion on the end of the soldering tip facing away from the soldering iron, which is intended for contacting the item to be soldered, in particular the connection element, during the soldering operation.

According to the invention, said end portion is substantially hemispherical. This enables efficient and simplified hand soldering of suitable connection elements, in particular connection elements with a central depression. The end portion in the shape of a hemisphere can be introduced into the depression such that an extensive area of the connection element, namely the area surrounding the depression, can be brought reproducibly into contact with the soldering tip. Thus, efficient and homogeneous energy input is achieved, which results in uniform fuzing of the soldering compound. The hemispherical shape of the end portion of the soldering tip additionally simplifies the soldering, since less care is required in terms of the positioning of the soldering iron. The soldering iron can be held perpendicular to the substrate or even obliquely—the hemispherical shape ensures a reproducible contact area between the soldering tip and the connection element.

The soldering iron is equipped with heating means to heat the soldering tip. The temperature is transferred from the soldering tip to the soldering compound, which is fuzed thereby. This type of soldering iron is referred to in the technical jargon as a "hot iron".

Said soldering iron is advantageously a hand-held soldering iron. The soldering tip according to the invention demonstrates its advantages in particular in hand soldering. Here, the precise positioning of the soldering iron is not completely reproducible, which is compensated by the contact area between the soldering tip of the connection element independently of the working angle. In contrast, however, the soldering tip requires very accurate local positioning relative to the connection element in order to fully contact the contact area. Tolerances in terms of the positioning of the connection element can be readily compensated during hand soldering such that the soldering tip can be very simply positioned with the required accuracy relative to the connection element. In the case of automated soldering, the position of the soldering tip is usually invariable such that the required adaptation to the precise position of the connection element in production tolerances is less simple.

The soldering tip is preferably an interchangeable soldering tip for a soldering iron. Such a soldering iron can be divided conceptually into three portions:
- an end portion for contacting the item to be soldered,
- a connection portion for connecting the soldering tip to the soldering iron,
- a middle portion, which extends between the end portion and the connection portion.

The design of the connection portion is substantially defined by the type of soldering iron with which the soldering tip is to be used and, consequently, must be compatible.

In principle, many connection systems are conceivable. Examples for this are plug-in connections, in which the end portion is inserted into a hole in the soldering iron and is fixed there, for example, by a magnet. Bayonet connections and screw connections, in which the end portion is provided with a thread or with holes through which the attachment screws can be guided.

In a preferred embodiment, the connection portion is widened compared to the middle portion such that the soldering tip can be secured on the soldering iron by means of a union nut. The union nut is screwed onto the soldering iron, which must, of course, be provided with a thread for this, and presses the widened connection portion against the soldering iron, by which means the soldering tip is securely fixed. The connection portion preferably has a flat connection surface on the side facing away from the middle portion, which is brought into contact with a corresponding flat connection surface of the soldering iron. The connection surfaces of the connection portion of the soldering tip and of the soldering iron are preferably congruent and are arranged congruently. With the use of a suitable union nut, it is, however, in principle, also possible to design the contact surface of the soldering tip smaller than the contact surface of the soldering iron. The widening of the connection portion compared to the middle portion is preferably at least 1 mm, particularly preferably at least 2 mm, to ensure a stable connection to the soldering iron.

In another preferred embodiment, the end portion of the soldering tip is suitable for insertion (plugging in) in the soldering iron. The soldering tip can be secured in the soldering iron, for example, with a laterally inserted screw. The end portion has, in a preferred embodiment, the same width as the middle portion.

The middle portion is preferably implemented in the shape of a right circular cylinder as this shape is, for one thing, customary for soldering tips and, for another, the cross-section of the middle portion corresponds to the cross-section of the hemispherical end portion, as a result of which the shapes are optimally matched, in particular if the circular cylinder has the same radius as the hemispherical end portion. However, in principle, other shapes of the middle portion are also conceivable, for example, with a square, rectangular, triangular, or polygonal cross-section. The middle portion can be straight or also angled.

The soldering tip should have high thermal conductivity. The soldering tip preferably contains copper and is particularly preferably made of copper or of a copper-containing alloy, such as brass or bronze alloys, for example, nickel silver or constantan. Copper has high conductivity and is relatively economical. In principle, however, other metals or alloys are also suitable as material for the soldering tip.

The soldering tip can be provided with a coating to optimize its properties. Thus, it is not the core material of the soldering tip, preferably copper, that comes into contact with the item to be soldered; but rather the coating, which can, consequently, also be referred to as a contact layer or wetting layer. The contact layer forms the outer surface of the soldering tip.

In an advantageous embodiment, the soldering tip is nickel plated, i.e., has a contact layer based on nickel, preferably made of nickel. The nickel contact coating slows transfer of heat from the soldering tip to the item to be soldered. Thus, scaling of the soldering tip, which can occur in particular with the use of copper, can be avoided. The thickness of the nickel layer is preferably from 5 µm to 30 µm, particularly preferably from 10 µm to 15 µm.

In an alternative embodiment, the soldering tip is hard chrome plated. In the context of the invention, the term "hard chrome plating" refers to a contact layer based on chromium, preferably made of chromium, with a thickness of at least 1 µm. The chromium contact layer preferably has a layer thickness from 10 µm to 80 µm, particularly preferably from 20 µm to 50 µm. Another layer, for example, a nickel layer with a thickness from 5 µm to 15 µm, can be arranged underneath the chromium contact layer. The hard chrome plating increases the surface hardness and, in particular, the surface tension of the soldering tip such that undesirable wetting of the soldering tip with uncontrolled outflowing soldering compound is prevented.

The geometric dimensions of the soldering tip depend in particular on the design of the soldering iron used and the desired soldering tip temperature and and can be appropriately selected by the person skilled in the art according to the requirements of the intended use. The overall length of the soldering tip is, for example, from 10 mm to 120 mm, preferably from 15 mm to 90 mm, in particular from 15 to 60 mm. Such a soldering tip is easy to handle and is heated adequately quickly and efficiently even in the end portion.

The radius of the hemispherical end portion (also corresponds to the length and width of the end portion) is, for example, from 1 mm to 20 mm, preferably from 3 mm to 15 mm, particularly preferably from 4 mm to 10 mm. The width of the middle portion is preferably in the same ranges and is particularly preferably the same as the radius of the end portion. The length of the middle portion is, in principle, limited only by the handling properties and the thermal conductivity of the soldering tip material. It is, for example, from 1 mm to 100 mm, preferably from 5 mm to 80 mm. The width of the connection portion depends on the soldering iron used and is, for example, from 1 mm to 30 mm, preferably from 4 mm to 20 mm. In an advantageous embodiment, the width of the connection portion corresponds to the width of the connection surface of the soldering iron. The length of the connection portion is preferably from 1 mm to 10 mm, in particular from 1 mm to 5 mm in the flange-like connection variant with a widened connection portion. The length of the connection portion is preferably from 10 mm to 100 mm, in particular from 20 mm to 80 mm in the connection variant with a plug-in connection portion.

The invention also includes a soldering iron, in particular a hand-held soldering iron, which is equipped with the soldering tip according to the invention and can be connected to a voltage source. The invention also includes in particular a soldering station, comprising a soldering iron equipped with the soldering tip according to the invention and a control unit connected thereto via a cable, which control unit can be connected to a voltage source.

The invention further includes a method for producing a pane with an electrical connection element, comprising
  (a) providing a substrate,
  (b) applying an electrically conductive structure on a region of the substrate,
  (c) arranging a soldering compound on a region of the electrically conductive structure and an electrical connection element on the soldering compound,
  (d) soldering the connection element with a soldering iron having a soldering tip according to the invention.

The soldering iron is in particular a hand-held soldering iron, with which the connection element is hand soldered.

A major advantage of the soldering tip according to the invention consists in very homogeneous energy input, which is ensured by the reliable contacting of the areas of the connection element surrounding the depression. This results in the fact that, overall, a lower energy input is necessary to fuze the entire soldering compound. The soldering compound thus has a low temperature and cools more rapidly to the solidification temperature. Shifting of the connection element on the liquid soldering compound can thus be avoided, for which reason no additional measures for securing a connection element have to be taken, which are necessary with conventional soldering methods, for example, clamping or gluing. In a preferred embodiment, such additional securing measures are dispensed with and, other than the contact pressure of the soldering tip, no further measures are taken for securing the connection element. The soldering process can thus be simplified significantly and, consequently, designed more economically. Moreover, so-called "cold solder spots" without adequate bonding between materials can be avoided.

The pane produced is preferably a glass pane, particularly preferably a window pane, specifically a vehicle pane.

The connection element must also be connected to a connection cable, which can be done before, during, or after the method according to the invention. The connection cable is provided to electrically connect the electrically conductive structure to an external functional element, for example, a voltage supply or a receiver. To that end, the connection cable is routed away from the pane, starting from the connection element preferably over the side edges of the pane. The connection cable can, in principle, be any connection cable that is known to the person skilled in the art for the electrical contacting of an electrically conductive structure. The connection cable can include, in addition to an electrically conductive core (inner conductor), an insulating sheathing, preferably polymeric, with the insulating sheathing preferably removed in the end region of the connection cable to enable an electrically conducting connection between the connection element and the inner conductor.

The substrate preferably includes glass, particularly preferably soda lime glass, as is customary for window panes. However, the substrate can, in principle, also include other types of glass, for example, quartz glass or borosilicate glass, or polymers, in particular transparent polymers, for example, polycarbonate or polymethylmethacrylate.

The substrate is preferably transparent or translucent. The substrate preferably has a thickness from 0.5 mm to 25 mm, particularly preferably von 1 mm to 10 mm and most particularly preferably from 1.5 mm to 5 mm.

The electrically conductive structure is implemented, in a preferred embodiment, as a fired printing paste. The printing paste preferably contains metallic particles, in particular silver particles, and glass frits. The printing paste can be applied on the substrate in the desired shape by various printing methods, preferably screen printing, and fired there. Printed conductive structures are customary in the field of vehicle glazings, for example, as heating conductors or antennas or busbars. A busbar establishes contact with another conductive structure, for example, a transparent heating coating, heating conductors, or thin-film surface electrodes and is provided to supply them with electrical current or to discharge current therefrom. The layer thickness of the printed structure is preferably from 5 µm to 40 µm.

The electrically conductive structure is implemented, in an alternative embodiment, as an electrically conductive foil, preferably as a copper foil or a copper-containing foil. Conductive structures in the form of foil strips are customary in the field of vehicular and architectural glazings, but also in the field of photovoltaics, in particular as busbars, or even as so-called foil conductors or flat conductors. Typically, heating wires, transparent heating coatings, or thin-film surface electrodes are electrically contacted by means of foils. The foil can be provided with a coating, for example, be silver plated or tinned. The foil preferably has a thickness from 10 µm to 500 µm, particularly preferably from 30 µm to 200 µm.

The soldering tip according to the invention displays its advantages in particular in the soldering of certain connection elements. Common to these connection element is the fact that they have a central depression. This means a depression on the side of the connection element facing away from the substrate, which is arranged roughly centrally when viewed from above. The depression can extend from the center even out to the side edges, for example, two opposing side edges, of the connection element.

The depression is surrounded by regions of the connection element, elevated in contrast thereto, and either completely or only partially encircling it, wherein, for example, the elevated parts are adjacent two opposite sides of the depression. In each case, elevated parts or sections or regions of the connection element are adjacent the central depression. The hemispherical end portion can be partially inserted into the depression. This means that a region of the end portion is inserted into the depression, while the remaining region of the end portion remains outside the depression. The soldering tip is thus brought into contact with the elevated parts of the connection element surrounding the depression. For this, the width of the soldering tip must, of course, be larger than the lateral dimension of the depression, in order to contact the surrounding parts. In addition, the depression must have a minimum depth such that the end portion can be adequately inserted into the depression and not strike the bottom of the depression, before the elevated areas of the connection element are contacted. The minimum depth depends on the radius of the end portion of the soldering tip. The necessary minimum depth can be determined in a simple manner by the person skilled in the art in the context of the invention. Accordingly, the person skilled in the art can select the soldering tip in accordance with the connection elements to be soldered or, conversely, can design the connection elements as a function of the soldering tip.

As a result of the design of the end portion of the soldering tip as a hemisphere, the parts of the connection element surrounding the depression are always reliably contacted, regardless of the angle at which the soldering iron is held relative to the substrate. This is advantageous in particular in the case of hand soldering, where, naturally, significant tolerances are present in terms of this angle.

In a preferred embodiment, the connection element is implemented as a male snap. Such a male snap has a central depression, which is peripherally surrounded, typically completely, by an elevated area. The depression and the surrounding region are typically round, viewed from above; however, other shapes are, in principle, also conceivable. It is also possible for the surrounding elevated region to be discontinuous.

The implementation of the connection element as a snap enables convenient connection of the conductive structure to electricity at the point of use: the necessary connection cable can be connected to the complementary female snap, which can then be attached to the male snap at the point of use in a simple manner.

In another preferred embodiment, the connection element is implemented as a B crimp around the connection cable. The connection element is typically a metal strip or plate, which is crimped around the connection cable. A crimp connection is simple, economical, and quick to produce and can readily be automated. Complicated additional process steps, for example, soldering or welding of the connection element to the connection cable can be avoided. At the same time, a very stable connection between the connection element and the connection cable is provided.

The crimped region of the connection element (the so-called "crimp", i.e., the region reshaped by the crimping operation) is soldered directly to the electrically conductive structure. Thus, the connection element differs from those that are also connected to the connection cable by crimping, but include, near the crimp, another section connected thereto that is specifically provided for soldering. As a result of the design of the connection element as a whole as a crimp, the connection element can be designed with advantageously small dimensions, thus reducing the space requirement for electrical contacting.

In an advantageous embodiment, the connection element is crimped over its entire length around the electrically conductive core of the connection cable. The connection element is then implemented as a whole as a crimp and consists only of the crimped region, which is advantageous in terms of material savings. However, the connection element can have, in addition to the section crimped around the electrically conductive core (the so-called "wire crimp"), one or a plurality of additional sections. Such an additional section can, for example, be crimped around the insulating sheathing of the connection cable (insulation crimp), by which means a more stable connection between connection element in the connection cable can be achieved. The connection element can also have, for example, short end sections that are not affected by the crimping.

The crimped region of the connection element is connected to the electrically conductive structure via the soldering compound. Here, this means a direct, mechanical connection between the crimped region of the connection element and the electrically conductive structure via the soldering compound. This means that soldering compound is arranged between the crimp and the electrically conductive structure and, thus, the crimp is secured durably stably on the electrically conductive structure.

Preferably, the soldering compound is not in direct contact with the electrically conductive core of the connection cable.

Crimp connections are customarily characterized with reference to their cross-section perpendicular to the extension direction of the connection cable. The shape of the crimping is determined by the selection of the crimping tool. One of the points of action of the crimping tool can produce a characteristic crimped structure, with the crimped structure typically arranged opposite the so-called crimp base. The shape of the crimping is named according to the characteristic crimped structure. The preferred crimp shape in the context of the present invention is the so-called B crimp. The two side edges bent around are, so to speak, plugged into the connection cable, yielding the shape of two arches opposite a preferably flat crimp base, such that the shape of the letter B reflected in the name is obtained.

The geometric dimensions of the crimp (crimp height, crimp width, crimp length) can be appropriately selected under consideration of the diameter of the connection cable as well as current standards.

The connection element is soldered on the electrically conductive structure via the crimp base such that the characteristic crimped structure is turned away from the substrate and soldering compound. The necessary central depression, into which the soldering tip can be partially inserted, is formed by the side edges of the connection element plugged into the connection cable. The arches of the B shape form the surrounding elevated areas that make contact with the soldering tip. In this case, the central depression extends over the entire crimp length between two opposite side edges of the connection element, whereas the depression is surrounded on both sides by the adjacent elevated areas.

The invention is not restricted to specific materials of the connection element. Typical connection elements are made of copper, ensuring high electrical conductivity. However, the connection element can also be made of other materials that are better adapted to the substrate in terms of their coefficient of thermal expansion, for example, titanium or stainless steel, when the substrate is made of glass. Thus, thermal stresses during soldering can be reduced. In a preferred embodiment, the difference between the coefficients of thermal expansion of the substrate and the connection element is less than $5 \times 10^{-6}/°$ C.

Typical material thicknesses of the connection element are from 0.1 mm to 4 mm, preferably of 0.3 mm and 1 mm. The length and width of the connection element is, for example, from 5 mm to 30 mm.

The invention is not restricted to the use of a specific soldering compound, but rather can be carried out with all soldering compounds. The invention is equally suitable for conventional lead-containing soldering compounds as well as for lead-free soldering compounds that are gaining increasingly greater significance, in particular in the automotive sector. The layer thickness of the soldering compound is preferably less than or equal to 0.6 mm.

The soldering compound can be positioned on the conductive structure and, subsequently, the connection element arranged on the soldering compound. However, in a preferred embodiment, the connection element is first provided with the soldering compound and arranged on the conductive structure together with the soldering compound. This has process technology advantages since the connection elements can be prepared in advance in large quantities with the portioned soldering compound. The soldering compound is preferably applied on the connection element as platelets or flattened drops with a fixed layer thickness, volume, and shape. The layer thickness of the soldering compound platelet is preferably less than or equal to 0.6 mm. The shape of the soldering compound platelet is preferably governed by the shape of the contact surface of the connection element.

The invention also includes the use of a soldering tip according to the invention for soldering an electrical connection element on an electrically conductive structure on a substrate, preferably a window pane, in particular a vehicle pane with a heating or antenna function.

The invention further includes the use of a pane produced according to the invention in buildings or in means of transportation for travel on land, in the air, or on water, in particular in rail vehicles or motor vehicles, preferably as a windshield, rear window, side window, and/or roof panel, in particular as a heatable pane or as a pane with antenna function.

The invention is explained in detail with reference to drawings and exemplary embodiments. The drawings are a schematic representation and not true to scale. The drawings in no way restrict the invention. They depict.

Figure 1:
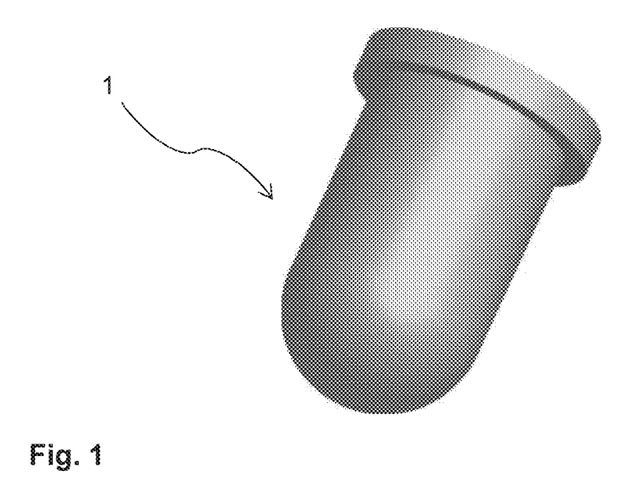
FIG. 1 a perspective view of an embodiment of the soldering tip according to the invention, FIG. 2 a cross-section through the soldering tip of FIG. 1, FIG. 3 a cross-section through the further embodiment of the soldering tip according to the invention, FIG. 4 a soldering station using the soldering tip of FIG. 1, FIG. 5 a cross-section through a preferred connection element for soldering with the soldering tip according to the invention, FIG. 6 a cross-section through a pane with the connection element of FIG. 5 during the method according to the invention, FIG. 7 a cross-section through a pane with another preferred connection element during the method according to the invention, and FIG. 8 a flowchart of an embodiment of the method according to the invention.
Figure 2:
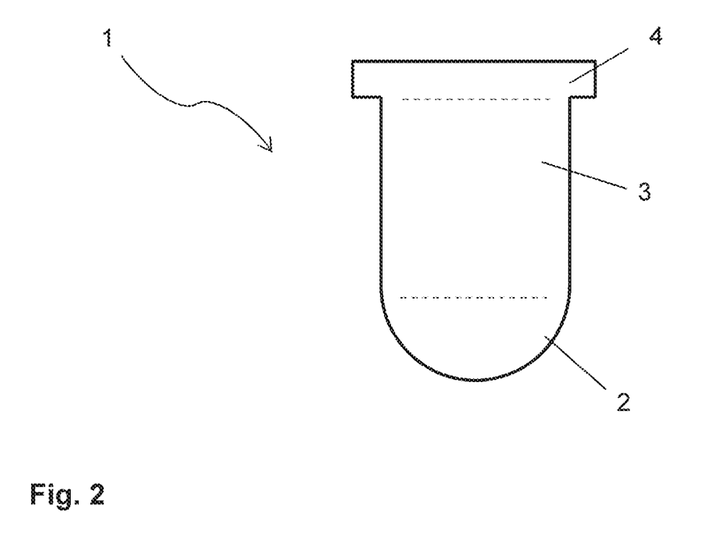

FIG. 1 and FIG. 2 depict in each case a detail of an embodiment of the soldering tip 1 according to the invention for a soldering iron, in particular a hand-held soldering iron. The soldering tip is implemented in one piece, but can be divided conceptually into three portions: an end portion 2, a middle portion 3, and a connection portion 4.

The end portion 2 serves for the contacting of the item to be soldered during soldering. The end portion 2 is, according to the invention, implemented in the shape of a hemisphere.

The middle portion 3 follows the end portion 2. The middle portion 3 is implemented in the shape of a right circular cylinder with the same radius as the hemispherical shape of the end portion 2.

The connection portion 4 follows the middle portion 3. The connection portion 4 is likewise in the shape of a right circular cylinder. The connection portion 4 is, however, widened compared to the middle portion 3, thus has a larger radius. The connection portion 4 thus forms a kind of lug. The end portion 4 serves for connecting the soldering tip 1 to the intended soldering iron. The surface of the connection portion 4 facing away from the middle portion 3 is flat and circular and can be connected flange-like to a corresponding connection surface of the soldering iron. The connection surface of the soldering iron preferably has, for this purpose, the same shape and size as the surface of the connection portion 4, is thus substantially congruent. The connection is preferably done with a union nut, which presses the end portion 4 against the soldering iron and is secured there by means of a thread. Alternatively, it is, for example, also possible to secure the end portion 4 on the soldering iron using screws guided through the lug.

In this embodiment, the length of the middle portion 3 is preferably from 5 mm to 80 mm, in particular from 10 mm to 50 mm. The length of the connection portion 4 is preferably from 1 mm to 10 mm, in particular from 1 mm to 5 mm.

The hemispherical shape of the end portion 2 has, for example, a radius of 4 mm, just like the cylinder shape of the middle portion 3. The middle portion 3 has, for example, a length of 43 mm. The connection portion 4 has, for example, a length of 3 mm and the cylinder shape of the connection portion 4 a radius of, for example, 6 mm. This yields an overall length of the soldering tip 1 of 50 mm.

The soldering tip 1 is made of copper, thus ensuring good thermal conductivity. The soldering tip 1 is hard chrome plated—it is coated with a single layer of chromium with a thickness of approx. 30 μm. Thus, the surface hardness is increased and wear is reduced. Moreover, soldering compound cannot adhere to the soldering tip 1, as is undesirably the case with the use of non-hard-chrome-plated copper. The risk of damage to the solder joint from adhering soldering compound at the time of removal of the soldering tip 1 after soldering is thus reduced.

The soldering tip 1 can, alternatively, also be nickel plated or have other coatings. The adhesive properties are affected by this.

Figure 3:
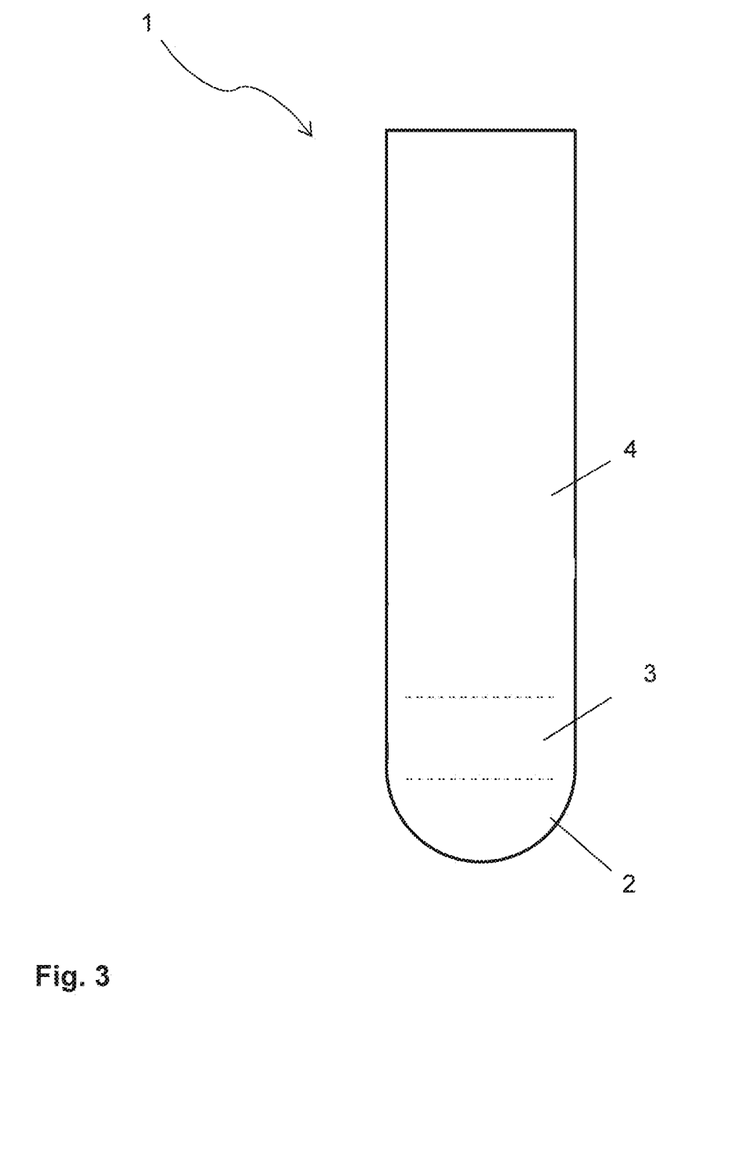

FIG. 3 depicts another embodiment of the soldering tip 1 according to the invention, which is connected to the soldering iron by means of a plug connection. For this, the connection portion 4 is plugged into a corresponding receptacle of the soldering iron and, for example, secured with a screw introduced laterally. The connection portion 4 and the middle portion 3 have the same dimensions and same cross-section. The middle portion 3 and the connection portion 4 thus form a continuous cylindrical extension of the hemispheric end portion 2, which is only conceptually subdivided into the middle portion 3 and the connection portion 4 in that the connection portion is inserted into the soldering iron and the middle portion protrudes from the soldering iron in the assembled state.

In this embodiment, the length of the middle portion 3 is preferably from 1 mm to 50 mm, in particular from 3 mm to 20 mm. The length of the connection portion 4 is preferably from 10 mm to 100 mm, in particular from 20 mm to 80 mm.

Figure 4:
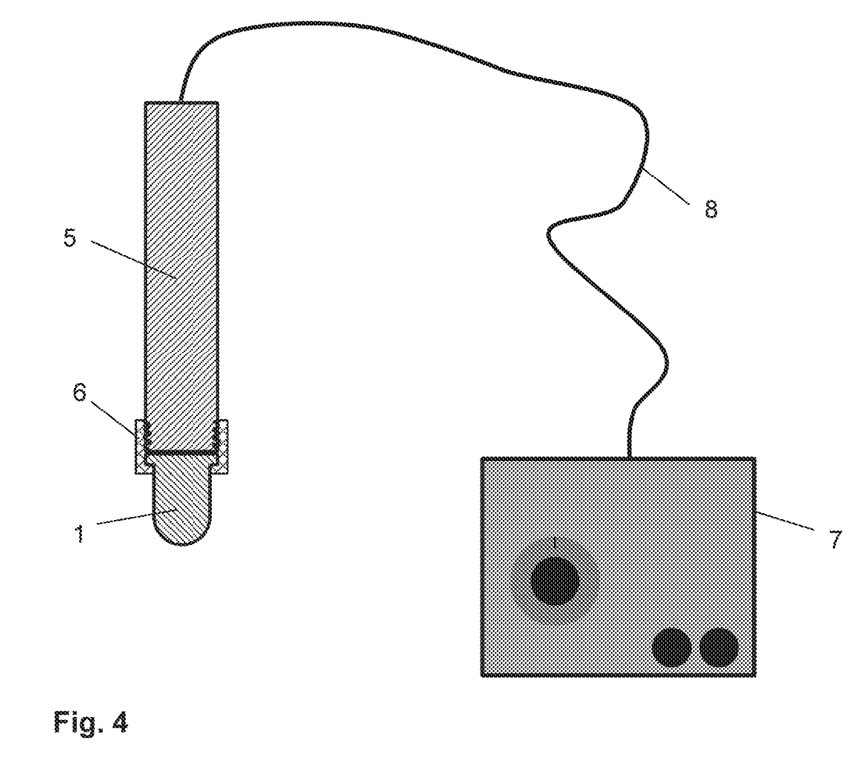

FIG. 4 depicts a soldering station using the soldering tip 1 according to the invention. The soldering tip 1 is mounted on a conventional hand-held soldering iron 5. For this, the connection portion 4 is arranged on a congruent connection surface of the soldering iron 5. The soldering tip 1 is secured there by means of a union nut 6, which is screwed onto a thread of the soldering iron 5. The soldering iron 5 is equipped with a heating cartridge to heat the soldering tip 1 to the temperature required for soldering. The soldering iron 4 is connected via an electrical cable 8 to a control unit 7, with which the heating function can be activated and deactivated and with which the heating power can be controlled. The control unit 7 is, for its part, connected to a voltage source by a cable (not shown).

The soldering tip 1 according to the invention can, in principle, be used with any available soldering iron 5. The connection region 4 of the soldering tip 1 need only be adapted to the respective soldering iron 5 so the the soldering tip 1 can be mounted on the soldering iron 5.

Figure 5:
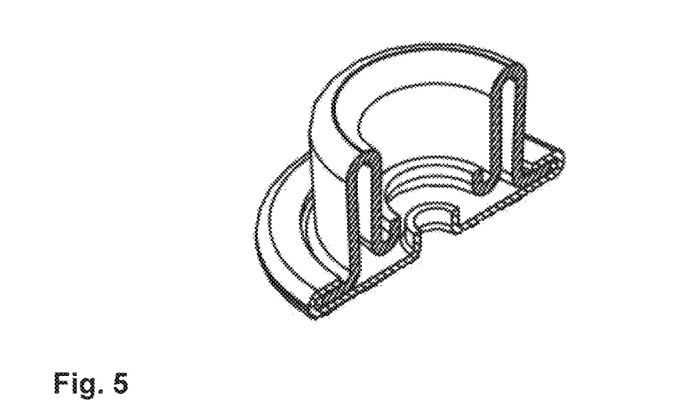

Alternatively to the controllable soldering station shown, it is also possible to use the soldering tip 1 on a non-controllable soldering iron, whose heating power cannot be adjusted by the user, FIG. 5 depicts, in a perspective view, a cross-section through an electrical connection element to be soldered preferably with the soldering tip 1 according to the invention. The connection element is implemented as a male snap. The snap is designed substantially as a hollow cylinder, thus having a central depression, as viewed from above, which is peripherally surrounded by a round elevated area.

The connection element is made, for example, of copper or stainless steel. The connection element can have coatings, for example, a silver coating to improve electrical conductivity.

The material thickness is, for example, approx. 0.3 mm. The round soldering surface on the underside of the connection element has, for example, a diameter of approx. 8 mm. The hollow cylinder forming the actual snap has, for example, an inside diameter of approx. 3 mm, an outside diameter of approx. 5.7 mm, and a height of approx. 3.5 mm.

The connection element is provided for and is suitable for being connected by plugging into a female snap (not shown). A connection cable is connected to the female snap. Thus, an electrical connection between the connection element and an external voltage source can be provided simply and conveniently at the point of use.

Figure 6:
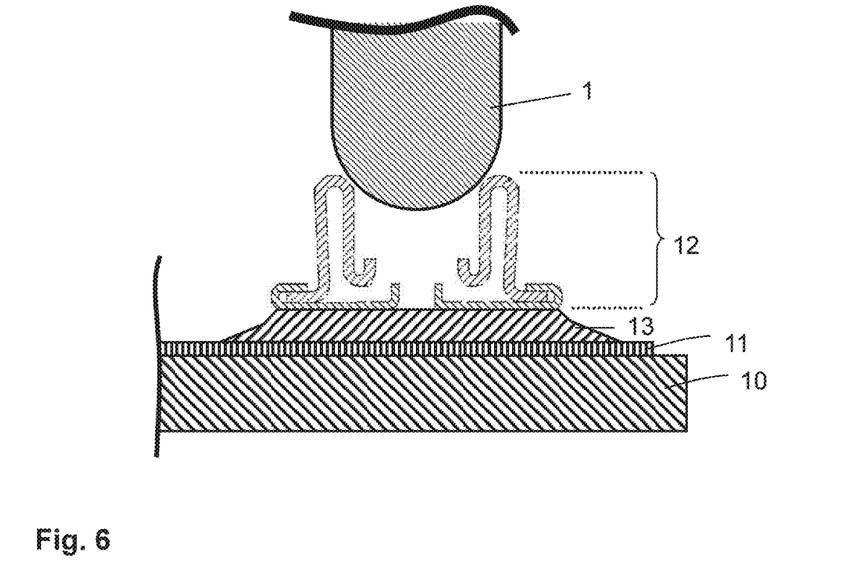

FIG. 6 depicts a cross-section through a pane with the electrical connection element 12 of FIG. 5 during the soldering operation according to the invention. The pane is, for example, a rear window of an automobile and comprises a substrate 1, which is a 3-mm-thick thermally prestressed single-pane safety glass made of soda lime glass. An electrically conductive structure 11 in the form of a heated conductor structure is printed on the substrate 10. The electrically conductive structure 11 contains silver particles and glass frits. In the edge region of the pane, the electrically conductive structure 11 is widened to a width of approx. 10 mm and forms a contact surface for the electrical connection element 12. The connection element 12 serves for the electrical contacting of the electrically conductive structure 11 to an external voltage supply via a connection cable (not shown). The electrical contacting is hidden from a viewer outside the automobile by a masking screen print between the electrically conductive structure 11 and the substrate 10.

The connection element 12 is to be connected to the electrically conductive structure 11 via a soldering compound 13. To this end, the soldering compound 13 is arranged between the conductive structure 11 and the connection element 12 and fuzed using the soldering tip 1. For this, the soldering tip 1 is brought into contact with the connection element 12, via which the necessary heat energy is introduced into the soldering compound 13. The end portion 2 of the soldering tip 1 is partially inserted into the central depression of the connection element 12. Since the soldering tip 1 has a larger diameter than the depression, the soldering tip 1 is not fully inserted into the depression. Instead, the edge region of the end portion 2 of the the soldering tip 1 is in contact with the areas of the connection element surrounding the depression, in other words, in this case, the upper edge of the hollow cylinder forming the snap. Of course, the depression must have a minimum depth depending on the radius of the end portion of the soldering tip 1 such that the soldering tip can be sufficiently lowered to establish the desired contact between the soldering tip 1 and connection 12.

From the figure, the advantage of the soldering tip 1 according to the invention is immediately obvious. Due to the hemispherical shape of the end portion 2, the contact between the soldering tip 1 and the connection element 12 illustrated is always achieved independently of the working angle of the soldering tip 1 relative to the substrate 10. During hand soldering, the technician thus need not be concerned with maintaining a precise working angle and, for example, with always holding the soldering iron exactly perpendicular to the substrate 10. This significantly facilitates the hand soldering. Moreover, the energy is introduced very homogeneously via the circular contact surface into the soldering compound 13, for the fuzing of which, consequently, less energy is necessary than with point-wise, decentralized energy input. Therefore, the soldering compound 13 is less strongly heated overall and solidifies faster after the end of the application of energy such that an undesirable shifting of the connection element 12 on the still liquid soldering compound 13 can be avoided, even without further securing measures. The positioning accuracy of the connection element 12 on the substrate 10 can thus be increased; the production tolerances can be reduced. These are major advantages of the present invention.

Figure 7:
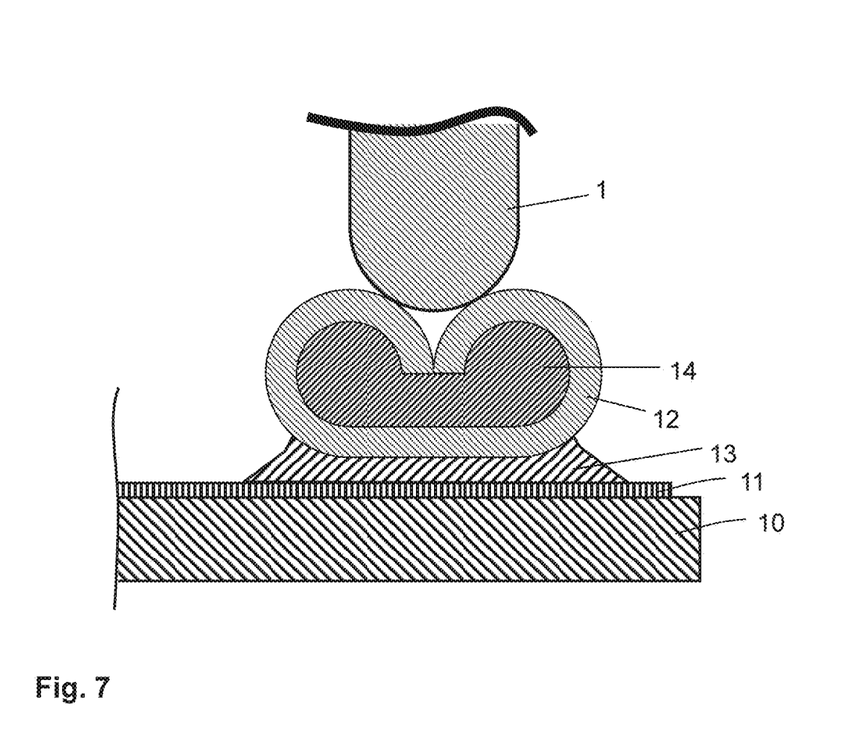

FIG. 7 depicts a cross-section through a pane with an alternative preferred embodiment of the electrical connection element 12 during the soldering operation according to the invention. The connection element 12 is implemented as a so-called B crimp—it consists of a small metal plate with a material thickness of, for example, 0.4 mm, for example, a copper plate or a stainless steel plate, that was bent around one end portion of a connection cable 14 and was durably stably connected to the connection cable 14 by crimping. The name "B Crimp" results from the characteristic shape of the connection element 12, obtained by plugging the bent-around side edges of the connection element 12 into the connection cable 14. The characteristic crimp shape shows, in profile, two rounded structures (arches) like the letter "B". The connection cable 14 is implemented as a stranded wire conductor, whose individual strands are uniformly diverted to the two sides of the contact interior, which results in advantageous stability and gas-tightness of the crimp contact. The crimp base forms the contact surface for the soldering compound 13; whereas, the characteristic crimp structure in the shape of a double arch is turned away from the substrate 10. The characteristic crimp structure forms a central depression into which the end portion 2 of the soldering tip 1 is partially inserted. The soldering tip 1 thus makes contact with the areas on the two arches surrounding the depression.

The depression of the connection element 12 is, in this embodiment, not peripherally surrounded by adjacent regions, but, instead, extends over the entire length of the connection element 12. The depression is delimited on two sides by the elevated arches.

The length of the connection element 12 is, for example, 4.5 mm (crimp length), the width (crimp width) approx. 2.5 mm, and in the height approx. 1.5 mm (crimp height).

Figure 8:
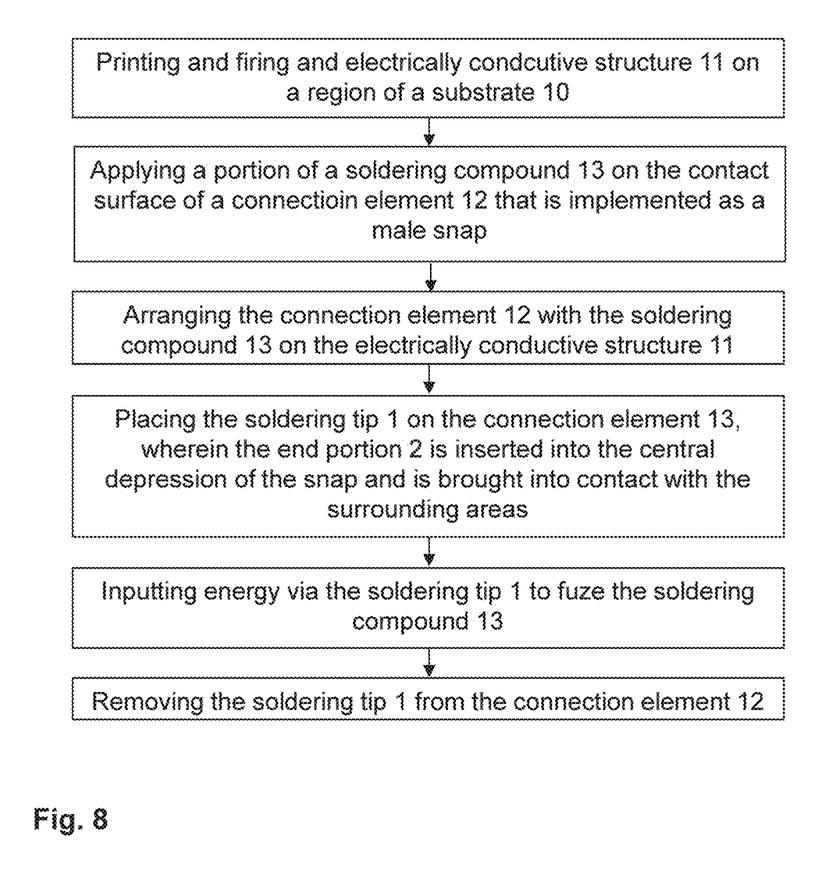

FIG. 8 depicts an exemplary embodiment of the method according to the invention for producing a pane with an electrical connection element 12 using the soldering tip 1 according to the invention.

EXAMPLES

Connection elements in the form of snaps (FIG. 5, FIG. 6) were soldered with a hand-held soldering iron to a silver print on the glass pane, in one case, using a soldering tip according to the invention and, in another, using a conventional soldering chisel. The connection elements soldered according to the invention had a stable solder joint at the rate of 100%; whereas, the conventionally soldered connection elements did not hold on the silver print (0% stable solder joint). The reason for this resides in the small contact area between the conventional chisel form and the snap, as a result of which low energy input was effected. The hemispherical soldering tip according to the invention effected, in contrast, efficient energy input, as a result of which the soldering compound is effectively fuzed and the connection element is stably soldered.

In addition, connection elements in the form of a B crimp (FIG. 7) were soldered with a hand-held soldering iron to a silver print on a glass pane, in one case, using a soldering tip according to the invention and, in another, using a conventional soldering chisel. The connection elements soldered according to the invention had a clean solder joint at the rate of 100%. In contrast, with the conventionally soldered connection elements, in approx. 50% of the cases, uncontrolled outflow of the soldering compound was observed, as a result of which the soldering compound sometimes made undesirable contact with the conductive core of the connection cable inside the crimp. The reason resides in the significantly more homogeneous energy input by the soldering tip according to the invention, by means of which the soldering compound is fuzed in a more controlled manner.

LIST OF REFERENCE CHARACTERS (1) soldering tip
(2) end portion of the soldering tip 1
(3) middle portion of the soldering tip 1
(4) connection portion of the soldering tip 1
(5) hand-held soldering iron
(6) union nut
(7) control unit
(8) cable between hand-held soldering iron 5 and control unit 6
(10) substrate
(11) electrically conductive structure
(12) electrical connection element
(13) soldering compound
(14) connection cable of the connection element 12

The invention claimed is:

1. A method for producing a pane with an electrical connection element, the method comprising:
   a) providing a substrate;
   b) applying an electrically conductive structure on a region of the substrate;
   c) arranging a soldering compound on a region of the electrically conductive structure and an electrical connection element on the soldering compound; and
   d) soldering the connection element with a soldering iron having a soldering tip,
      wherein the soldering tip comprises a substantially hemispherical end portion, and
      wherein the connection element has a central depression into which the substantially hemispherical end portion of the soldering tip is partially inserted so to bring the soldering tip into contact solely with areas of the connection element surrounding the central depression.

2. The method according to claim 1, wherein the substantially hemispherical end portion is implemented in a hand-held soldering iron.

3. The method according to claim 1,
   wherein the soldering tip has a substantially cylindrical middle portion and a cylindrical connection portion, and
   wherein the cylindrical connection portion is widened compared to the substantially cylindrical middle portion, so to allow the soldering tip to be secured on the soldering iron via a union nut.

4. The method according to claim 1, wherein the substantially hemispherical end portion contains copper.

5. The method according to claim 1, wherein the substantially hemispherical end portion is nickel plated.

6. The method according to claim 1, wherein the substantially hemispherical end portion is chrome plated with a chromium layer having a thickness of at least 1 μm.

7. The method according to claim 1,
   wherein the soldering iron is a hand-held soldering iron, and
   wherein the soldering step d) comprises hand soldering the connection element with the hand-held soldering iron.

8. The method according to claim 1,
   wherein the substrate contains glass, and
   wherein the electrically conductive structure is implemented as one of a) a fired printing paste containing silver particles, and b) an electrically conductive foil.

9. The method according to claim 8, wherein the glass comprises soda lime glass.

10. The method according to claim 1, wherein the connection element is implemented as a male snap.

11. The method according to claim 1, wherein the connection element is implemented as a B crimp around a connection cable.

\* \* \* \* \*